(12) United States Patent
Cao

(10) Patent No.: US 10,349,649 B2
(45) Date of Patent: Jul. 16, 2019

(54) ANIMAL TRAP DEVICE

(71) Applicant: CIXI HAOSHENG ELECTRONICS & HARDWARE CO., LTD., Cixi (CN)

(72) Inventor: Jin-Jun Cao, Ningbo (CN)

(73) Assignee: CIXI HAOSHENG ELECTRONICS & HARDWARE CO., LTD., Cixi, Zhejiang (CN)

( * ) Notice: Subject to any disclaimer, the term of this patent is extended or adjusted under 35 U.S.C. 154(b) by 254 days.

(21) Appl. No.: 15/604,678

(22) Filed: May 25, 2017

(65) Prior Publication Data

US 2018/0338487 A1   Nov. 29, 2018

(51) Int. Cl.
*A01M 23/24*   (2006.01)
*A01M 23/34*   (2006.01)

(52) U.S. Cl.
CPC ................... *A01M 23/34* (2013.01)

(58) Field of Classification Search
CPC ................................................ A01M 23/24
USPC ......................................................... 43/87
See application file for complete search history.

(56) References Cited

U.S. PATENT DOCUMENTS

| | | | | |
|---|---|---|---|---|
| 3,149,803 A | * | 9/1964 | Petrides | B64C 39/022 244/17.13 |
| 8,948,928 B2 | * | 2/2015 | Alber | B64C 39/022 244/17.11 |
| 9,056,676 B1 | * | 6/2015 | Wang | B64F 1/00 |
| 9,826,256 B2 | * | 11/2017 | Sham | G06Q 30/0265 |
| 9,952,022 B2 | * | 4/2018 | Ueno | F41H 7/04 |
| 2009/0294584 A1 | * | 12/2009 | Lovell | B63B 27/10 244/110 F |
| 2009/0314883 A1 | * | 12/2009 | Arlton | B64C 39/024 244/63 |
| 2011/0180667 A1 | * | 7/2011 | O'Brien | B64C 39/022 244/135 R |
| 2011/0315810 A1 | * | 12/2011 | Petrov | B64C 39/022 244/17.23 |
| 2012/0181380 A1 | * | 7/2012 | Van Staagen | B64B 1/50 244/33 |
| 2014/0183300 A1 | * | 7/2014 | MacCulloch | B64C 39/024 244/1 TD |
| 2017/0161972 A1 | * | 6/2017 | Moloney | G07C 5/0841 |

(Continued)

FOREIGN PATENT DOCUMENTS

WO    WO-2017147188 A1 *  8/2017  ............. B64D 47/08

*Primary Examiner* — Christopher P Ellis
(74) *Attorney, Agent, or Firm* — Leong C. Lei

(57) ABSTRACT

An animal trap device is disclosed and includes a base, a circular cover plate, an elastic element and an elastic lasso. The circular cover plate further includes a top portion, and a surrounding portion; wherein the surrounding portion surrounds a circumference of the top portion. The top portion has a support disc and a flange protruding from a side surface of the support disc. The elastic element is configured between the base and the circular cover plate, and adapted to provide the top portion with an upward elastic force. The elastic lasso is wound around the surrounding portion, and positioned below the flange. The elastic lasso will be blocked by the flange and the surrounding portion, retained in an open position until leaving the surrounding portion when the top portion is exerted with a force to move downward.

8 Claims, 5 Drawing Sheets

(56) References Cited

U.S. PATENT DOCUMENTS

2018/0050797 A1* 2/2018 Palmer .................. B64C 39/022
2018/0118374 A1* 5/2018 Lombardini .............. B60L 9/00

* cited by examiner

ANIMAL TRAP DEVICE

TECHNICAL FIELD OF THE INVENTION

The present invention relates to an animal trap device, and more particularly to a trap capturing an animal with a rope snare.

DESCRIPTION OF THE PRIOR ART

There are many different animal traps are used today, such as clamp-type trap, cage-type trap and snare-type trap, and the clamp-type trap is the most commonly used. However, the clamp-type trap always cause damage to a prey's limb or even death of the trapped prey due to excessive bleeding. In addition, the clamp-type trap has two jaws which are retained in the open position by a trigger mechanism. The clamp-type trap uses a strong spring as a power source, a user can be hurt while setting up the clamp-type trap improperly. Furthermore, the clamp-type traps must be totally disguised from the prey; therefore, passengers may be clamped or hurt by accident.

Further, the cage-type trap has specific setting and releasing mechanisms which consist of a pan, a trigger rod, a latching device, a door, a locking device and a spring. The locking device is disengaged, the door is opened and the latch is set when the trap is set. In order to release the trapped animal, a step of disengaging the locking device, a step of opening the door and a step of setting the latch are performed again. There is a need for a cage-type trap that provides the user with an easy, essentially one-handed method of setting the trap.

Thus, a snare-type trap was created in order to prevent the defects mentioned above, and the known snare-type trap includes a base, a circular cover plate, an elastic element and an elastics lasso. Further, the elastic element is configured between the base and the circular cover plate, and adapted to provide the circular cover plate with an upward elastic force. However, the well-known snare-type trap may be easily stuck because the foreign bodies enter into an empty between the circular cover plate and the base, so that the circular cover plate cannot move downward and the snare-type trap is malfunctioned.

SUMMARY OF THE INVENTION

To improve the defects mentioned above, the present invention is proposed. The present invention provides a top portion disposed into a surrounding portion in order to prevent the foreign bodies from sucking the device. Additionally, the surrounding portion has an inclined surface so that an elastic lasso will be tightened rapidly to capture a leg of the trapped animal, and a height of movement of the elastic lasso is increased to enhance the success rate of trapping the animal. Therefore, the present invention can overcome the deficiencies of conventional snare-type trap, and increase the probability of capturing the prey.

To achieve the objects mentioned above, an animal trap device of the present invention may comprise a base, a circular cover plate, an elastic element and an elastic lasso. The base may have a plurality of posts and at least one slot. The circular cover plate may comprise a top portion and a surrounding portion; wherein the top portion may have a support disc and at least one flange protruding from a side surface of the support disc; and a surrounding portion surrounds a circumference of the top portion and has at least one through hole and at least one convex part. The elastic element may be configured between the base and the circular cover plate, and adapted to provide the top portion with an upward elastic force. The elastic lasso may be wound around the surrounding portion and disposed between the at least one flange and the at least one convex part. The elastic lasso may be blocked by the at least one flange and the at least one convex part, and retained in an open position until leaving the surrounding portion when the top portion is exerted with a force to move downward.

Preferably, the top portion may disposed into the surrounding portion, so that the at least one flange may disposed through the at least one through hole.

Preferably, the surrounding portion may comprise an inclined surface and a bottom surface, the at least one through hole may be located on the inclined surface, and at least one convex part may be located on the bottom surface.

Preferably, the at least one through hole may be closely disposed to the at least one convex part, so that the at least one flange moves in the at least one through hole until stopping moving by the at least one convex part.

Preferably, a bottom part of the surrounding portion may have a plurality of grooves, and the positions of the plurality of grooves may be corresponding to the positions of the plurality of posts, so that the plurality of posts is fastened to the plurality of grooves.

Preferably, the bottom part of the surrounding portion may have at least one protrusion, and the position of the at least one protrusion may be corresponding to the position of the at least one slot, so that the at least one protrusion is fastened to the at least one slot.

Preferably, the elastic lasso comprises a rope and a spring. The rope may comprises a main body, a fixed end and a movable end, and the movable end may be coupled to the main body after the rope is wound around the at least one flange and the at least one convex part. Further, the spring may be configured on the main body and positioned between the fixed end and the movable end, and adapted to provide the movable end with a push force.

Preferably, the fixed end may further comprise a retainer ring.

DETAILED DESCRIPTION OF THE PREFERRED EMBODIMENTS

Figure 1:
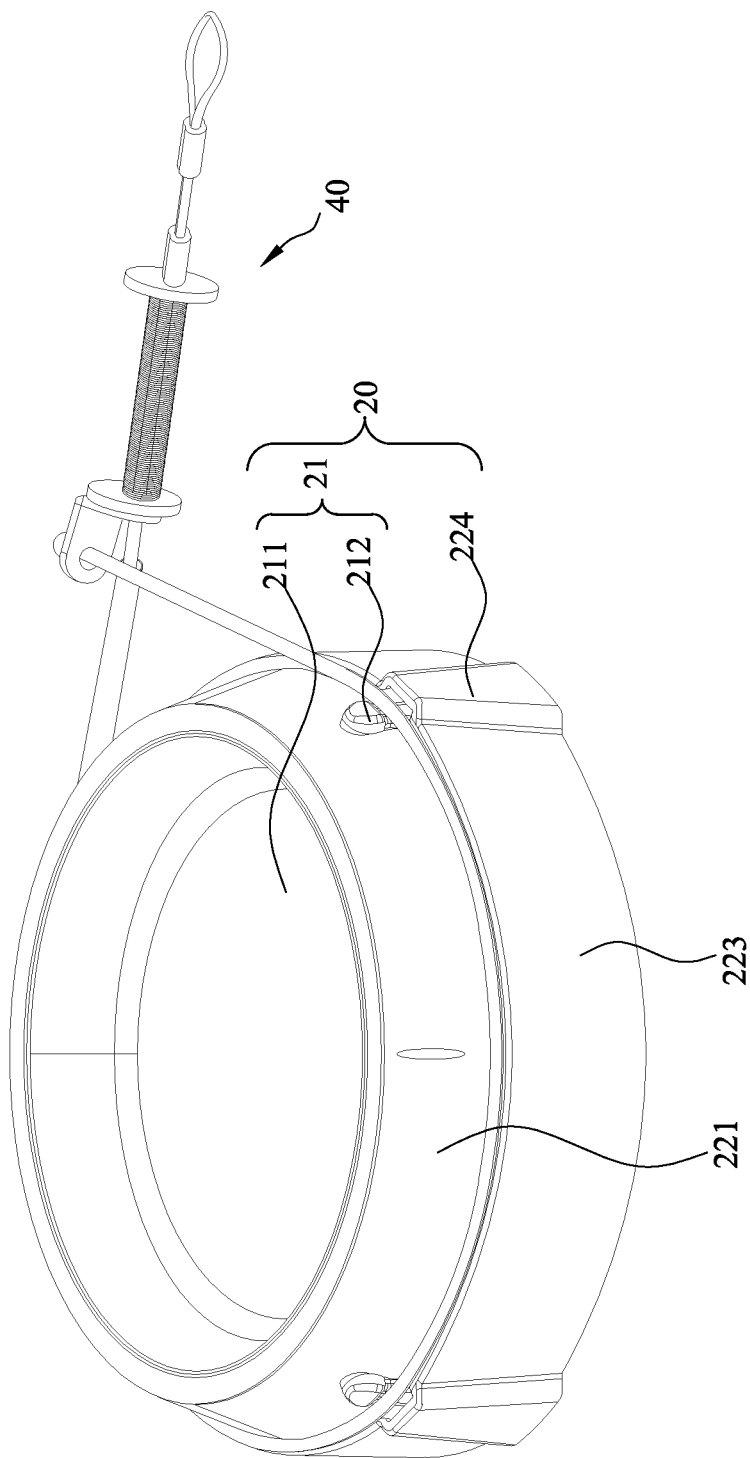
FIG. 1 is a perspective view of a preferred embodiment according to the present invention.
Figure 2:
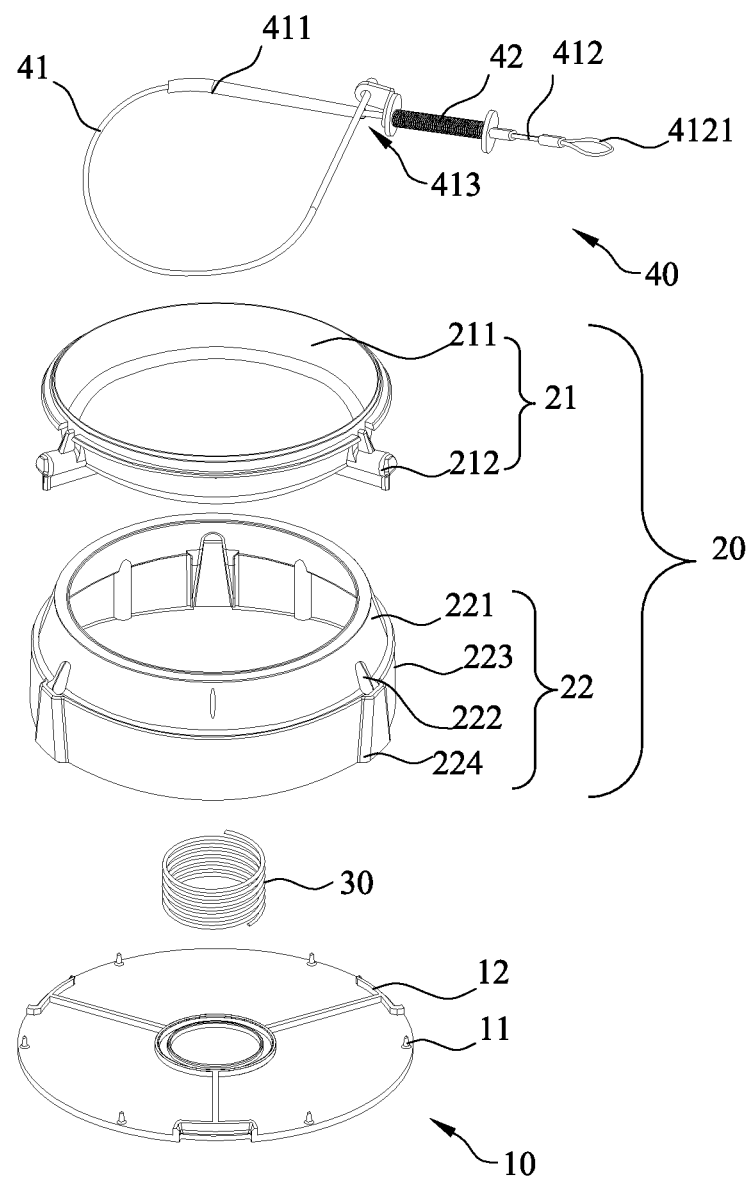
FIG. 2 is an exploded view of the preferred embodiment according to the present invention.
Figure 3:
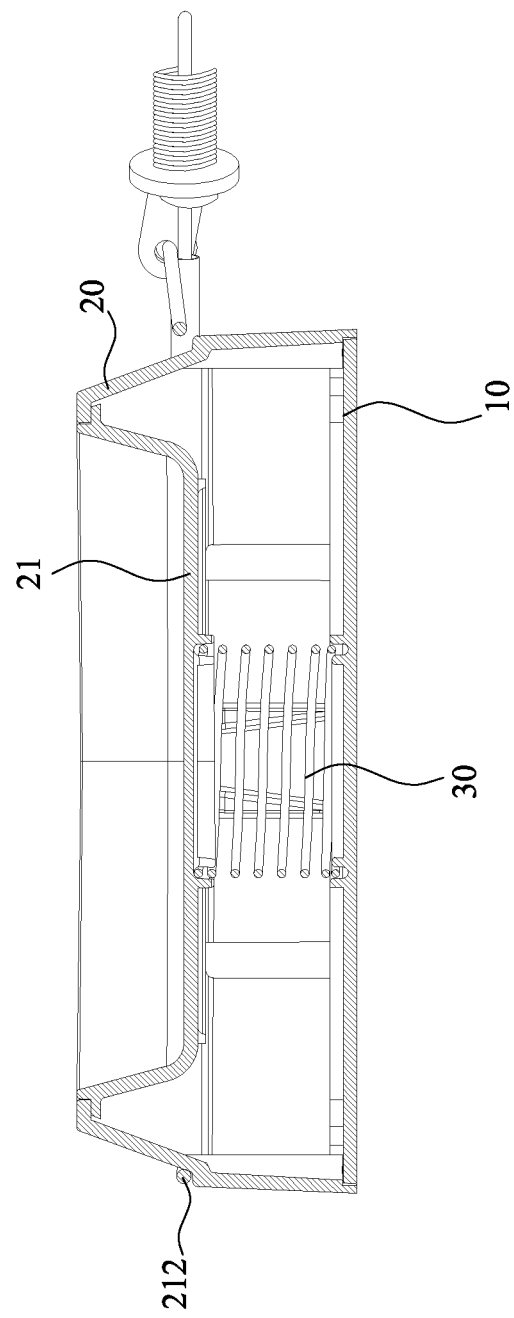
FIG. 3 is a cross-sectional view of the preferred embodiment according to the present invention.

Referring to FIGS. 1 to 3, an animal trap device 1 includes a base 10, a circular cover plate 20, an elastic element 30 and an elastic lasso 40.

Furthermore, the base 10 has a plurality of posts 11 and at least one slot 12, in the present embodiment, for example, six posts 11 and three slots 12 are adopted, as shown in FIG. 2. In addition, the circular cover plate 20 comprises a top portion 21 and a surrounding portion 22; wherein a top portion 21 has a support disc 211 and at least one flange 212 protruding from a side surface of the support disc 211; and the surrounding portion 22 surrounds a circumference of the top portion 21 and has at least one through hole 222 and at least one convex part 224. Further, the top portion 21 is disposed into the surrounding portion 22, so that the at least one flange 212 is disposed through the at least one through hole 222.

Additionally, the surrounding portion 22 comprises an inclined surface 221 and a bottom surface 223, the at least one through hole 222 is located on the inclined surface 221, and the least one convex part 224 is located on the bottom surface 223. Further, a bottom part (not shown in figures) of the surrounding portion 22 has a plurality of grooves (not shown in figures), and the positions of the plurality of grooves are corresponding to the positions of the plurality of posts, so that the plurality of posts are fastened to the plurality of grooves. The bottom part of the surrounding portion 22 has at least one protrusion (not shown in figures), and the position of the at least one protrusion is corresponding to the position of the at least one slot, so that the at least one protrusion is fastened to the at least one slot.

Furthermore, referring to FIG. 3, the elastic element 30 is configured between the base 10 and the circular cover plate 20, and adapted to provide the top portion 21 with an upward elastic force when the top portion 21 is exerted with a force to move downward, so that the at least one flange 212 moves upward in the at least one through hole (not shown in figures).

Furthermore, the elastic lasso 40 is wound around the surrounding portion 22; the elastic lasso 40 is blocked by the at least one flange 212 and the at least one convex part 224, and retained in an open position until leaving the surrounding portion when the top portion 21 is exerted with a force to move downward. The elastic lasso 40 will be tightened rapidly when it leaves the at least one flange 212 and at least one convex part 224; wherein the implementation structures of the elastic lasso 40 may include a rope 41 and a spring 42. The rope 41 includes a main body 411, a fixed end 412 and a movable end 413; wherein the movable end 413 is coupled to the main body 411 after the rope 41 is wound around one circle, and the spring 42 is configured on the main body 411 and positioned between the fixed end 412 and the movable end 413, so as to provide the movable end 413 with a push force. Therefore, the movable end 413 is allowed to move in an opposite direction to the fixed end 412 to cause the wound circle to reduce rapidly after the rope 41 is released from the surrounding portion 22, and the movable end 413 will not stop moving until the rope 41 is wound around an object tightly. It must be noted that the elastic lasso 40 is only explanatory and exemplary, the present invention is not so limited, and all elastic lassos 40 with a knot or other structure, which can achieve the same object, may be used as an equivalent device of the present invention. The fixed end 412 may further include a retainer ring 4121, which may be coupled to other fixed object or extension wire.

Figure 4:
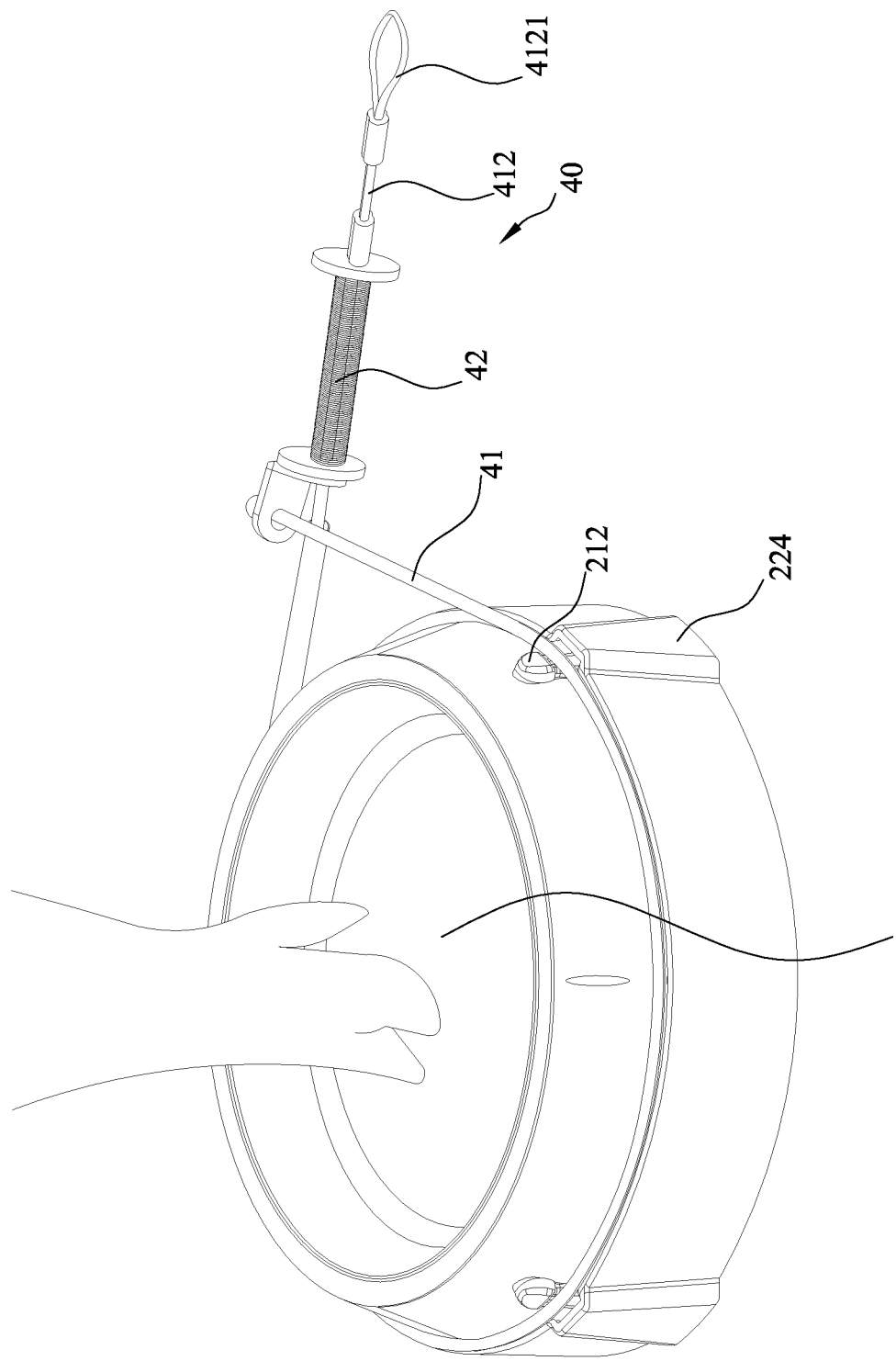
FIGS. 4 to 5 are schematic views of actuation of the preferred embodiment according to the present invention.
Figure 5:
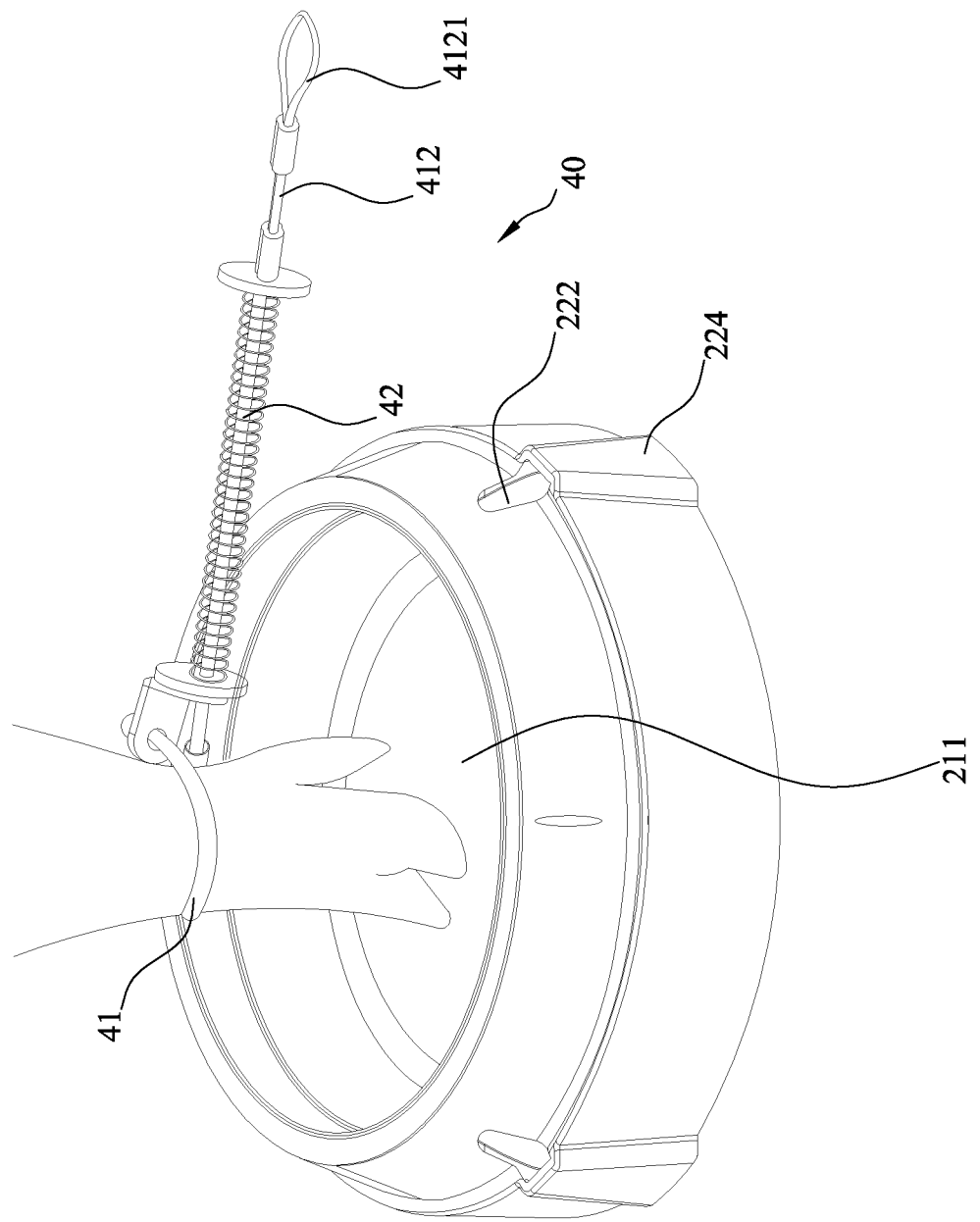

Referring to FIGS. 4 to 5, the elastic lasso 40 is not moved due to the surrounding portion 22 and the at least one flange 212. When the support disc 211 of the circular cover plate 20 is exerted with a force to overcome the strength of the elastic element 30 to move downward, and the elastic lasso 40 will be released from the surrounding portion 22 and the at least one flange 212 and thereafter tightened after the at least one flange 212 is close to the at least one convex part 224, thereby achieving the capture of an animal.

It is noted from the elements mentioned above that the embodiment does not use any sharp object such that it does not cause a wound on the captured animal deep into its body, thereby preventing its death caused from excessive bleeding due to the wound on it. Furthermore, a person may hold the tightened rope open by themselves to release them from it because it is nothing but a rope snare even if they are trapped inadvertently.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

I claim:

1. An animal trap device comprising:
    a base having a plurality of posts and at least one slot;
    a circular cover plate including:
        a top portion having a support disc and at least one flange protruding from a side surface of the support disc; and
        a surrounding portion surrounding a circumference of the top portion and having at least one through hole and at least one convex part;
    an elastic element configured between the base and the circular cover plate, and adapted to provide the top portion with an upward elastic force; and
    an elastic lasso wound around the surrounding portion and disposed between the at least one flange and the at least one convex part;
    wherein the elastic lasso is blocked by the at least one flange and the at least one convex part, and retained in an open position until leaving the surrounding portion when the top portion is exerted with a force to move downward.

2. The animal trap device according to claim 1, wherein the top portion is disposed into the surrounding portion, so that the at least one flange is disposed through the at least one through hole.

3. The animal trap device according to claim 1, wherein the surrounding portion comprises an inclined surface and a bottom surface, the at least one through hole is located on the inclined surface, and the at least one convex part is located on the bottom surface.

4. The animal trap device according to claim 1, wherein the at least one through hole is closely disposed to the at least one convex part, so that the at least one flange moves in the at least one through hole until stopping moving by the at least one convex part.

5. The animal trap device according to claim 1, wherein a bottom part of the surrounding portion has a plurality of grooves, and the positions of the plurality of grooves are corresponding to the positions of the plurality of posts, so that the plurality of posts is fastened to the plurality of grooves.

6. The animal trap device according to claim 1, wherein the bottom part of the surrounding portion has at least one protrusion, and the position of the at least one protrusion is corresponding to the position of the at least one slot, so that the at least one protrusion is fastened to the at least one slot.

7. The animal trap device according to claim 1, wherein the elastic lasso comprises:
    a rope comprising a main body, a fixed end and a movable end, and the movable end being coupled to the main body after the rope is wound around the at least one flange and the at least one convex part; and a spring configured on the main body and positioned between the fixed end and the movable end, and adapted to provide the movable end with a push force.

8. The animal trap device according to claim 7, wherein the fixed end further comprises a retainer ring.

\* \* \* \* \*